United States Patent [19]

Andersson

[11] Patent Number: 4,503,970
[45] Date of Patent: Mar. 12, 1985

[54] ROLLER DEVICE FOR ROLLER CONVEYORS

[75] Inventor: Kjell Andersson, Löddeköpinge, Sweden

[73] Assignee: Alfa-Laval AB, Tumba, Sweden

[21] Appl. No.: 460,575

[22] Filed: Jan. 24, 1983

[30] Foreign Application Priority Data

Feb. 1, 1982 [SE] Sweden ............................... 8200533

[51] Int. Cl.³ .......................................... B65G 13/06
[52] U.S. Cl. ............................................. 198/781
[58] Field of Search ............... 198/781, 789, 790, 791, 198/615

[56] References Cited

U.S. PATENT DOCUMENTS

| | | | |
|---|---|---|---|
| 3,605,990 | 2/1968 | Cowen, Jr. ...................... | 198/781 |
| 4,063,636 | 12/1977 | vom Stein ........................ | 198/789 |

FOREIGN PATENT DOCUMENTS

| | | | |
|---|---|---|---|
| 0086181 | 8/1983 | European Pat. Off. ............ | 198/789 |
| 2752610 | 11/1977 | Fed. Rep. of Germany ...... | 198/789 |

*Primary Examiner*—Joseph E. Valenza
*Assistant Examiner*—Douglas C. Voorhees
*Attorney, Agent, or Firm*—Cyrus S. Hapgood

[57] ABSTRACT

A roller device for roller trains or roller conveyors has a unit consisting of one side face of a load-carrying roller and a supporting shaft projecting from said side face and being non-rotatably connected to the load-carrying roller and adapted to support a drive pulley which is intended to be driven by a belt, chain or the like and can be passed on to the supporting shaft with any one of its ends facing said side face of the roller and which at one of said ends has coupling means adapted, when the drive pulley is mounted on the supporting shaft with one end facing said side face of the roller, to engage coupling means on the unit so as to provide a non-rotatable engagement between the drive pulley and the load-carrying roller, said drive pulley, at its other end, being so designed that when the drive pulley is mounted on the supporting shaft with the opposite end facing said side face of the roller, it comes clear of the coupling means of the unit and is rotatable on the supporting shaft. The roller device further has retention means for the drive pulley to retain the drive pulley on said supporting shaft, said means comprising adjustable pressure means mounted on said unit for displacement along the supporting shaft and adapted, at the end of the drive pulley which faces away from said side face of the roller, to urge the opposite end of the drive pulley into contact with said side face of the roller.

7 Claims, 1 Drawing Figure

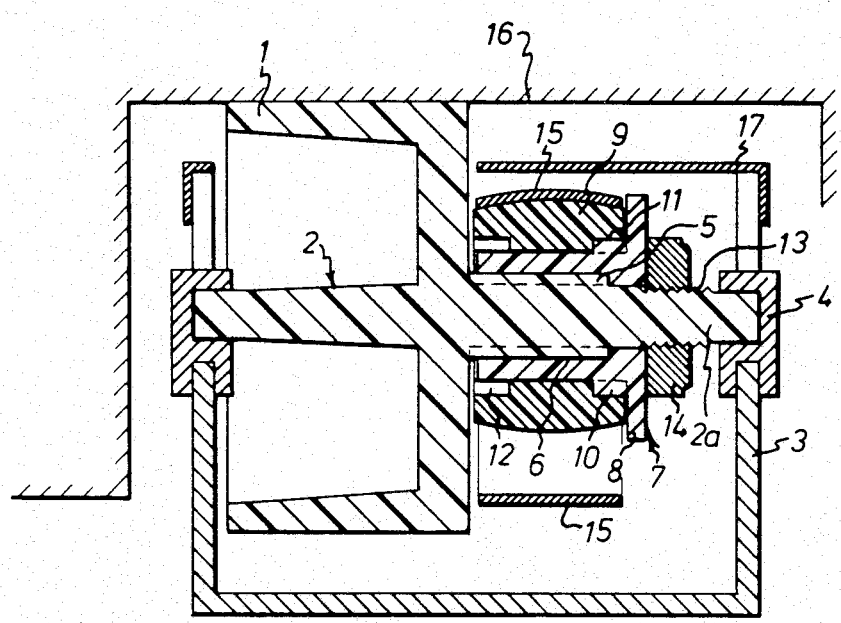

ROLLER DEVICE FOR ROLLER CONVEYORS

The present invention relates to a roller device for roller trains or roller conveyors.

Prior art roller devices for roller conveyors and often the roller-bearing frames of the roller conveyors are specially designed for either undriven function, fixedly driven function or accumulatively driven function. This is a drawback if, in a roller conveyor, one wishes to use two of these functions or all three functions at the same time, or if one wishes to alter a roller conveyor in respect of these functions, because special rollers must be kept in stock for each function and be specially mounted on special frames.

The object of the invention is to provide a roller device for roller conveyors which in one and the same roller conveyor frame can be readily switched between undriven, fixedly driven and accumulatively driven functions.

According to the invention, this is achieved by means of a roller device which has a unit consisting of one side face of a load-carrying roller and a supporting shaft projecting from said side face and being non-rotatably connected to the load-carrying roller and adapted to support a drive pulley which is intended to be driven by a belt, chain or the like and can be passed on to the supporting shaft with any one of its ends facing said side face of the roller and which at one of said ends has coupling means adapted, when the drive pulley is mounted on the supporting shaft with one end facing said side face of the roller, to engage coupling means on the unit so as to provide a non-rotatable engagement between the drive pulley and the load-carrying roller, said drive pulley, at its other end, being so designed that, when the drive pulley is mounted on the supporting shaft with the opposite end facing said side face of the roller, it comes clear of the coupling means of the unit and is rotatable on the supporting shaft, the roller device further having retention means for the drive pulley, to retain the drive pulley on said supporting shaft, said means comprising adjustable pressure means mounted on said unit for displacement along the supporting shaft and adapted, at the end of the drive pulley which faces away from said side face of the roller, to urge the opposite end of the drive pulley into contact with said side face of the roller.

The roller device of the invention thus is easy to switch between undriven, fixedly driven and accumulatively driven functions by removing the drive pulley from the supporting shaft or reversing the drive pulley on the supporting shaft. The drive pulley is slidably mounted directly on the load-carrying roller, whereby no frictional losses by the mounting of the drive pulley are had in the case of accumulative driving. When the pressure means is designed as a nut, no special tools are required for mounting the drive pulley and modifying the pressure exerted on the drive pulley for varying the accumulative pressure. The roller device may be given a short length and several roller conveyors can easily be arranged at a distance from each other adjusted to the width of the load to be conveyed. For instance, a driving belt may drive an arbitrary number of rollers in one and the same roller conveyor for fixed driving and/or accumulative driving and will not interfere with any rollers which may be mounted for undriven function. The roller device according to the invention can be made of plastics at a low price and requires little maintenance.

The invention will be described in greater detail hereinbelow with reference to the accompanying drawing which is a sectional view of an embodiment of the roller device according to the invention when mounted for accumulative driving.

A load-carrying roller 1 is mounted slidingly rotatable at the ends of a shaft 2 integrally formed with the roller 1, on the flanges of a U-shaped frame bar 3 by means of radial bearings 4. One side face of the roller is planar and compact, and the portion 2a of the shaft 2 which is located at this side face is designed with radial lands 5 which extend from said side face of the roller 1 a certain distance towards the free end of the shaft portion 2a. These lands 5 are adpated to be accommodated in mating grooves 6 provided at the inner side of a bushing 7 which prior to mounting the roller 1 on the bar 3 has been slid on to said shaft portion 2a at the free end thereof, the engagement between the lands 5 and the grooves 6 locking the load-carrying roller 1 and the bushing 7 in a non-rotary manner. The bushing 7, at its end facing away from said side face of the roller 1, has a flange 8 and supports, with a sliding fit, a drive pulley 9 whose end surfaces engage the inner side of the flange 8 and said side face of the load-carrying roller 1. Adjacent the flange 8, the outer face of the bushing is provided with radial ridges 10 which are adapted to be freely accommodated in a circumferential depression 11 at the inner surface of the drive pulley 9 when the drive pulley is oriented for accumulative driving as illustrated in the drawing. At the opposite end, the drive pulley is designed in its inner surface with grooves 12 mating with the ridges 10 and adapted each to receive one ridge 10 so as to non-rotatably lock the drive pulley 9 and the load-carrying roller 1, by the intermediary of the bushing 7, when the drive pulley is mounted on the bushing in a reversed position of orientation, i.e. for fixed driving of the roller 1. The drive pulley can be assembled with the bushing before this is mounted on the shaft portion 2a. As shown in the drawing, the roller 1, the drive pulley 9 and the shaft 2, in the sequence stated, have decreasing radii, whereby functional reliability is obtained in accumulative driving.

Said shaft portion 2a has substantially beyond the flange 8 a threaded portion 13 cooperating with a nut 14 which can be tightened for squeezing the drive pulley 9 between the flange 8 and the load-carrying roller 1. To this end, the length of the bushing, as counted from the inner face of the flange, is slightly less than the length of the drive pulley. A driving belt 15 cooperates with the drive pulley 9. A load on the roller is designated 16 and a cover for the open end of the U-bar 3, from which the load-carrying roller 1 alone protrudes, is designated 17.

The roller device can be used for the following functions:

(1) Undriven function, where the drive pulley 9 is removed from the shaft portion 2a and the bushing 7 is optionally used for increasing the flexural strength of the shaft 2 and for guiding the driving belt 15 by means of the flange 8.

(2) Fixedly driven function, where the drive pulley 9 is mounted on the bushing 7 in such a manner that the ridges 10 and the grooves 12 engage one another and the drive pulley is engaged by the driving belt 15.

(3) Accumulatively driven function, where the drive pulley 9 is mounted on the bushing 7 in a reversed position in relation to the position of fixed driving, i.e. such that the ridges 10 are accommodated in the depression 11, in which case the drive pulley, actuated by the driving belt 15, can rotate with respect to the load-carrying roller 1, and the propulsive moment or sliding engagement between the side face of the roller and the drive pulley can be adjusted by means of the nut 14.

Preferably, the above-described components 1–2, 7, 9 are compression-moulded from plastics.

In the light of the above description, different modifications within the scope of the invention are obvious to the expert. For instance, the bushing may be dispensed with, the shaft portion 2a and the inner side of the drive pulley being then designed for engagement and free mutual rotation, e.g. with the aid of means similar to the ridges 10, the depression 11 and the grooves 12. The flange 8 may then consist of for instance a disk with an irregular centre hole for cooperating with a complementary part on the outer side of the shaft 2a. A flange 8 non-rotatably connected to the shaft 2 is advantageous since it entails that the nut will not be subjected to any torque in the case of accumulative driving, and also it will serve as a guide for the driving belt. However, it may be dispensed with without departing from the concept of the invention. Instead of being non-rotatably connected to the shaft 2, the roller device may be slidably mounted on a separate bearing shaft, the illustrated shaft 2 being designed with a centre opening housing this bearing shaft. The load-carrying roller 1 may have a flange at its side facing the drive pulley for laterally supporting a load. Instead of a belt as driving means, use may be made of for instance a chain, in which case the outer side of the drive pulley is designed for chain engagement.

I claim:

1. A roller device for roller trains or roller conveyors, characterized in that it has a unit consisting of one side face of a load-carrying roller (1) and a supporting shaft (2a, 7) projecting from said side face and being non-rotatably connected to the load-carrying roller (1) and adapted to support a drive pulley (9) which is intended to be driven by a belt, chain or the like and can be passed on to the supporting shaft with any one of its ends facing said side face of the roller and which at one of said ends has coupling means (12) adapted, when the drive pulley is mounted on the supporting shaft with one end facing said side face of the roller, to engage coupling means (10) on the unit so as to provide a non-rotatable engagement between the drive pulley and the load-carrying roller, said drive pulley, at its other end, being so designed (at 11) that, when the drive pulley is mounted on the supporting shaft with the opposite end facing said side face of the roller, it comes clear of the coupling means (10) of the unit and is rotatable on the supporting shaft, the roller device further having retention means (8, 14) for the drive pulley to retain the drive pulley on said supporting shaft, said means comprising adjustable pressure means (14) mounted on said unit for displacement along the supporting shaft and adapted, at the end of the drive pulley which faces away from said side face of the roller, to urge the opposite end of the drive pulley into contact with said side face of the roller.

2. Device as claimed in claim 1, characterized in that the retention means comprises an abutment member (8) mounted on the supporting shaft (2a, 7) and adapted to engage the end of the drive pulley which faces away from said side face of the load-carrying roller and being in a non-rotary engagement with said unit (1, 2a, 7), said pressure means (14) being adapted to engage the end of the abutment member which faces away from the drive pulley.

3. Device as claimed in claim 2, characterized in that the supporting shaft consists of two concentric parts, of which the inner part (2a) is fixed to the load-carrying roller (1) and the outer part (7) is slidingly mountable on the inner part from the free end thereof and non-rotatably connectible to the inner part, said outer part (7) forming a bearing bushing for the drive pulley and being provided at its outer surface with said coupling means (10) and, at its end facing away from said side face of the roller, with a flange (8) forming said abutment member.

4. Device as claimed in any one of claims 1–3, characterized in that the coupling means of the unit (1, 2a, 7) consist of radial ridges (10) on the supporting shaft, that the coupling means on the drive pulley (9) consist of grooves (12) mating with said ridges and formed in the inner surface of the drive pulley (9) at one end thereof, and that the drive pulley at its other end is designed with a circumferential depression (11) in its inner surface for housing said ridges (10).

5. Device as claimed in any one of claims 1–3, characterized in that the supporting shaft (2a, 7) is non-rotatably connected to journals for mounting the roller device in a roller conveyor (3).

6. Device as claimed in any one of claims 1–3, characterized in that the load-carrying roller (1), the drive pulley (9) and the supporting shaft (2a), in the sequence stated, have decreasing diameters.

7. Device as claimed in any one of claims 1–3, characterized in that the load-carrying roller (1), the supporting shaft (2a), the drive pulley (9), and the bushing (7) are compression-moulded from plastics.

* * * * *